United States Patent [19]

Reed

[11] 4,431,763

[45] Feb. 14, 1984

[54] FLEXIBLE SOLVENT BARRIER COATING

[75] Inventor: Katherine E. Reed, Stillwater, Minn.

[73] Assignee: Minnesota Mining and Manufacturing Company, St. Paul, Minn.

[21] Appl. No.: 413,418

[22] Filed: Aug. 31, 1982

[51] Int. Cl.[3] ........................ C08K 5/05; C08L 75/04; C09D 3/72

[52] U.S. Cl. .................................... 524/389; 524/385; 524/451; 524/591; 524/903

[58] Field of Search ............... 524/389, 591, 451, 903, 524/385

[56] References Cited

U.S. PATENT DOCUMENTS

| | | | |
|---|---|---|---|
| 3,911,178 | 10/1975 | McDowell et al. | 427/316 |
| 4,018,849 | 4/1977 | Chang et al. | 525/520 |
| 4,098,740 | 7/1978 | Wallace | 524/517 |
| 4,140,836 | 2/1979 | Wallace | 428/463 |
| 4,147,679 | 4/1979 | Scriven et al. | 523/404 |
| 4,180,491 | 12/1979 | Kim et al. | 524/389 |
| 4,185,047 | 1/1980 | Cohen | 524/451 |
| 4,187,204 | 2/1980 | Howard | 524/591 |
| 4,203,883 | 5/1980 | Hangauer, Jr. | 524/591 |
| 4,205,115 | 5/1980 | Piccirilli et al. | 428/334 |
| 4,218,355 | 8/1980 | Chang et al. | 524/291 |
| 4,263,188 | 4/1981 | Hampton et al. | 523/181 |
| 4,265,797 | 5/1981 | Suk | 524/903 |
| 4,268,552 | 5/1981 | Duvdevani et al. | 524/451 |
| 4,273,808 | 6/1981 | Neirynck et al. | 427/142 |
| 4,277,380 | 7/1981 | Williams et al. | 524/591 |
| 4,363,885 | 12/1982 | Fukui et al. | 524/451 |
| 4,365,028 | 12/1982 | Leep et al. | 524/389 |

*Primary Examiner*—Ronald W. Griffin
*Attorney, Agent, or Firm*—Donald M. Sell; James A. Smith; David L. Weinstein

[57] ABSTRACT

Composition for effectively sealing the surface of a substrate from penetration by solvents commonly used in automotive primer, paint and paint thinners. The coating composition is particularly useful for providing a sealed surface for priming and topcoating reaction injected molded urethane, reinforced reaction injection molded urethane, and other substrates which are sensitive to the organic solvents normally present in automotive primer and paint. The composition for sealing the surface of the substrate comprises a urethane polymer, water, and a monohydric alcohol having less than seven carbon atoms.

16 Claims, No Drawings

FLEXIBLE SOLVENT BARRIER COATING

BACKGROUND OF THE INVENTION

This invention relates to the area of coatings, and, in particular, to a surface-sealing composition for priming and topcoating substrates made from reaction injected molded (RIM) urethane, reinforced RIM urethane, and other materials which are sensitive to the organic solvents normally present in automotive primer and paint.

Soft fascia is a generic term used to describe flexible plastic automobile parts, such as bumper covers and front ends, which are usually painted to match the color of the vehicle body. A common soft fascia material is reaction injection molded urethane, although there are others including thermoplastics and EPDM (ethylene propylene diene monomer) polymers. Flexible plastic fenders which are glass reinforced reaction injection molded urethane are also being used by automobile manufacturers. In a collision, these components may sustain damage in the form of scratches, gouges, punctures, or tears. These components cannot be repaired by conventional techniques used for metal parts, e.g., welding or applying body patch or filler.

Reaction injection molded urethane and reinforced reaction injection molded urethane are microcellular foams which have highly cross-linked skins. When an automotive component made of RIM urethane or reinforced RIM urethane is repaired, the manufacturer-applied paint is removed by sanding. Sanding also removes the skin and exposes the underlying foam. The damaged area is filled with a repair material and sanded to a flat smooth surface. When primer and paint are applied, the repaired area appears to shrink, and it feels lower than the surrounding area. In actuality, the urethane foam substrate absorbs solvents from the primer and topcoat and swells around the patched area which was protected by the repair material. Although the absorbed solvents eventually evaporate, the paint film ceases to flow and level relatively quickly, with the result that the demarcation between the repair material and swollen substrate dries as a wrinkle in the paint.

In order to determine the severity of the solvent absorption problem, coupons of RIM urethane were allowed to soak twenty-four hours in a conventional lacquer thinner, DuPont 3661, manufactured by E. I. DuPont de Nemours and Co., in the major individual components of DuPont 3661, in certain selected organic solvents, and in water. The dimensions of the coupons were 3.0 cm×1.0 cm×0.32 cm. Both major surfaces of the coupons had skins. The edges of coupons did not have skins. The absorption of solvent by the urethane coupon was expressed as percent weight gain. The results are set forth in Table I:

TABLE I

| Solvent | Percent Weight Gain of RIM Urethane |
|---|---|
| DuPont 3661* | 70.4 |
| Acetone | 72.4 |
| Toluene | 65.5 |
| Butyl Acetate | 62.0 |
| "Cellosolve" Acetate (ethylene glycol monoethyl ether acetate) | 57.7 |
| Xylene | 50.7 |
| Methanol | 39.7 |
| Ethanol | 27.8 |
| 1-Propanol | 17.9 |
| 2-Propanol | 12.2 |
| 1-Butanol | 21.6 |
| 2-Butanol | 20.2 |
| tert-Butanol | 5.1 |
| 1-Pentanol | 11.3 |
| 2-Pentanol | 11.8 |
| 3-Pentanol | 7.7 |
| 2-Hexanol | 9.9 |
| Cyclohexanol | 10.3 |
| Hexane | 11.5 |
| Water | 1.5 |

*DuPont 3661 comprises 54% toluene, 14% "Cellosolve" acetate/butyl acetate, 12% isopropanol, 11% acetone, 6% xylene, 3% methanol.

It will be observed that aromatic hydrocarbons "oxygenated" solvents, i.e., ketones, esters, and ethers, and the DuPont lacquer thinner were absorbed to the extent of about 40 to about 70 percent of the weight of the urethane. Hexane, hexanols, pentanols, and isopropanol were absorbed at about the 8 to 13 percent level. Only water had little effect on the urethane samples. The coupon soaked in the lacquer thinner also experienced increases in length, width, and thickness of about 25 percent along each dimension. This dimensional increase represented a virtual doubling of volume. Because the eye can detect a scratch 0.1–0.2 micrometers deep, or 0.004% of the thickness of standard 0.32 cm RIM urethane, an increase in thickness of 25%, or about 800 micrometers, is readily noticeable.

The swelling of urethane around the repair material is evident when primer is applied. Where solvent is drawn away from the primer by the urethane substrate, the primer dries rapidly; however, it stays wet longer over the repair material. Expansion of the urethane foam can be observed at the boundary of the repair. When the primer has dried, the ridge can be sanded flat, but another application of primer or topcoat causes the ridge to develop again because solvents can permeate the primer. Several applications of primer with careful sanding of the ridge between coats can produce a perfect finish. However, this is a time-consuming process, resulting in an excessively thick layer of primer beneath the topcoat.

SUMMARY OF THE INVENTION

This invention involves a coating composition which, when applied to a fascia substrate, acts as a barrier to solvent penetration from later-applied solvent-borne coatings. The coating prevents the appearance of depressions in the substrate when primer and paint are applied. The composition is a one-part, water-borne system which, upon application, dries in about 30 minutes.

The composition comprises the following essential ingredients: (1) a fully reacted, water-dilutable urethane polymer formed from the reaction of a glycol or polyol of polyester or polyether with a diisocyanate; (2) water; and (3) any monohydric alcohol having less than seven carbon atoms. In order to render the composition suitable for use in a commercial environment, the following ingredients are added to the essential ingredients: filler, dispersant for the filler, foam control agent, flow/leveling agent, pigment, and a volatile base.

The composition is particularly useful for coating substrates made from microcellular urethane foam material, which tend to swell excessively in the presence of organic solvents normally used in primers and topcoats for automotive purposes.

The composition can be coated on a substrate, particularly a substrate which is sensitive to organic solvents normally found in automotive primer and paint, with the result that the coating will act as a barrier to solvent penetration from subsequent solvent-borne coatings. The composition also forms a flexible coating on a substrate which is subject to bending.

The composition may also be used for coating areas in rigid parts such as in metal surfaces, e.g., automotive parts, appliances, etc., wooden surfaces, e.g., furniture, and surfaces made of synthetic organic materials.

DETAILED DESCRIPTION

The urethane polymer of the present invention may be aliphatic or aromatic. It is preferable to employ aliphatic urethane polymers, because aromatic urethane polymers may discolor when exposed to ultraviolet light. If aromatic urethane polymers are employed, it is useful to add ultraviolet absorbing materials to the composition. Formed from the reaction of a glycol or polyol of polyester or polyether with a diisocyanate, the urethane polymer should be fully reacted, i.e., the polymer should have no residual isocyanate groups and no residual hydroxyl groups. Urethane polymers having residual isocyanate groups would be reactive with the water in the composition. Urethane polymers having residual hydroxyl groups are moisture sensitive, i.e., these groups could cause the coating to bubble or blister. In addition, the urethane polymer should be fully reacted in order to provide a one- part system. As stated previously, the polyurethane must be water-dilutable, i.e., the polyurethane must be capable of forming an emulsion or dispersion which is dilutable with water. A representative list of commercially available water-dilutable urethane polymers includes "Spensol" L-44, "Spensol" L-51, "Spensol" L-52 and "Spensol" L-54, which are aqueous colloidal dispersions of tertiary amine salts of urea-urethane polymers manufactured by the Spencer Kellogg Division of Textron, Buffalo, New York; "Witcobond" W-290H and "Witcobond" W-240, which are urethane latexes manufactured by Witco Chemical Corporation, New York, New York; "NeoRez" R-960, a water-borne polyurethane manufactured by Polyvinyl Chemical Industries, Wilmington, Massachusetts.

The process for preparing "Spensol" water-borne urea-urethane polymers is disclosed in Hangauer, Jr., U.S. Pat. 4,203,883, which patent is herein incorporated by reference for the purpose of describing suitable polyurethanes and methods for preparing them. The colloidal, urea-urethane polymers disclosed in this patent are preferred for the coating composition of the present invention. These polymers can be made by reacting an aqueous dispersion of a tertiary amine-neutralized, isocyanate-terminated urethane prepolymer with triamine-containing polyamine, especially both triamine and diamine. The isocyanate-terminated urethane prepolymer is formed by the reaction of diisocyanate and polyol, at least a portion of which has at least one carboxylic group which is relatively non-reactive with isocyanates. A portion of all of the carboxylic groups of the urea-urethane is neutralized with tertiary amine groups to provide a polymer which can have a relatively neutral pH in an aqueous dispersion, e.g., having a pH of less than about 11, preferably less than about 10. The urea-urethane polymers have an average particle size in the colloidal size range, e.g., less than about 0.1 micrometer. The urea-urethanes have sufficient tertiary amine neutralized, carboxylic groups to provide stable, aqueous dispersions having infinite dilutability with water. More specifically, the infinitely water-dilutable, colloidal aqueous dispersion of urea-urethane polymer salt is prepared by the following method:

1. A tertiary amine and water are added to an isocyanate-terminated prepolymer formed by reacting (a) polyisocyanate, and (b) polyol containing sufficient carboxylic groups which are relatively non-reactive with isocyanate to provide the prepolymer with an acid value of about 17 to 60 on an unneutralized solids basis, and thus permit the formation of an aqueous dispersion of the prepolymer in water as a tertiary amine salt;

2. The prepolymer salt dispersion is reacted with polyamine consisting essentially of triamine having an average of at least about 2.2 amine nitrogen atoms having active hydrogen per molecule of polyamine to form a urea-urethane polymer salt dispersion containing at least about 0.8 weight percent, preferably 1.3 to 6 weight percent, carboxylic groups in tertiary amine salt form on a solids basis. The salt-forming tertiary amine is generally provided in a mole ratio to the carboxylic groups of the prepolymer of about 0.3:1 to 2:1, say 0.3:1 to 1.3:1, or more, preferably about 0.5:1 to 2:1. Preferred tertiary amines include a trialkyl amine, having 3 to about 12 carbon atoms, such as trimethyl amine, triethyl amine, methyl diethyl amine, N,N-dimethylethanol amine, tripropyl amine, and the like.

The tertiary amine may, for instance, be reacted with urethane prepolymers having free carboxylic acid groups. The tertiary amine is preferably added to the prepolymer in the presence of a sufficient amount of water to form a dispersion of the neutralized prepolymer in the water. The water may conveniently be added in admixture with the tertiary amine. Alternatively, the tertiary amine may be added before the addition of the water. Frequently, the water is provided in a weight ratio to urethane prepolymer solids of about 0.2:1 to 5:1, preferably about 0.5:1 to 3:1, on a total weight basis.

The urea-urethane products are made by chain extension of the urethane prepolymers with triamine-containing polyamine, especially both triamine and diamine. Enough triamine must be present in the chain-extending polyamine to provide an average of substantially more than 2, e.g., at least about 2.2, amine nitrogen atoms having active hydrogen per molecule of polyamine reacted. Advantageously, the average active amine hydrogen functionality of free polyamine mixture ranges from about 2.2 to 2.8 amine nitrogen atoms having active hydrogen per molecule of polyamine, and preferably is about 2.3 or 2.4 to 2.6, e.g., about 2.5 active hydrogen containing amine nitrogen atoms per molecule of polyamine. The chain extending polyamine can include components which are essentially hydrocarbon polyamines having 2 or 3 amine groups providing reactive hydrogens in accordance with the Zerewitinoff test, e.g., primary and secondary amine groups, and having 1 to about 40 or more carbon atoms, preferably about 2 to 15 carbon atoms.

The polyurethane sold under the trademark "NeoRez" R-960 is an anionic stabilized aliphatic polyurethane in which the backbone chain includes carboxylic acid groups. It is supplied by Polyvinyl Chemical Industries in the form of an aqueous colloidal dispersion.

Nuclear magnetic resonance (NMR) and infrared (IR) analyses of several commercially available urethane polymers revealed that these polymers had been composed of the monomers set forth in Table II (the totals do not add up to 100 percent due to rounding). The NMR and IR spectra were obtained on the Varian XL-100 and Perkin-Elmer 283 spectrophotometers. All NMR spectra were run in chloroform-d solution after vacuum stripping the water.

TABLE II

| Monomer | Polyester Urethane | |
|---|---|---|
| | "Spensol" L-51 (Mole Percent) | "Spensol" L-54 (Mole Percent) |
| 4,4'-methylene bis(cyclo-hexylisocyanate) | 19 | 9 |
| Adipic acid | 30 | 41 |
| Hexane diol | 28 | 37 |
| Neopentyl glycol | 19 | |
| Diethylene glycol | | 9 |
| Dimethylolpropionic acid | 3 | 5 |

NMR and IR analyses indicated that the "Spensol" compositions comprised the following non-aqueous components in the amounts set forth in Table III (the totals do not add up to 100 percent due to rounding).

TABLE III

| Ingredient | "Spensol" L-51 (Weight Percent) | "Spensol" L-54 (Weight Percent) |
|---|---|---|
| Polyester urethane from Table II | 60 | 69 |
| N—Methyl pyrrolidone | 36 | 27 |
| Triethylamine | 2 | 4 |

Water acts as a diluent so that a viscosity which renders the composition sprayable can be achieved. It is employed in the composition because it does not result in significant swelling of RIM and reinforced RIM substrates.

The alcohol is used to establish compatibility between the urethane polymer and organic solvents such as toluene, acetone, and methyl ethyl ketone which are generally used in paint thinners. In the absence of the alcohol, the urethane polymer will congeal or coagulate when it comes in contact with common organic solvents. In addition, the preferred alcohol accelerates the drying of the coating. Suitable alcohols are those that are monohydric and contain fewer than seven carbon atoms. Examples of these alcohols are methanol, ethanol, propanol, isopropanol, butanol, and cyclohexanol. The preferred alcohol solvent for use with RIM urethane or reinforced RIM urethane is isopropanol, because its drying and non-swelling characteristics are ideal for substrates made from these materials.

Additives are useful to enhance the properties of the composition to promote ease of application, shelf-life, and utility. A filler is incorporated into the composition in order to impart sandability. In the absence of filler, the coating is essentially abrasion resistant, i.e., it is not readily sandable. The particle size of the filler is chosen so that the surface of the dried composition can be sanded to the extent that surface irregularities are not visible after a color coat is applied. The filler must be water-dispersible, must not dissolve in the composition, and must not change the pH of the composition so as to cause coagulation of the polyurethane. Suitable fillers include talc, aluminum oxide, barium sulfate, titanium dioxide, glass microspheres, carbon black, mica, silica, aluminum powder, and diatomaceous earth. Talc allows the dried composition to be sanded easily and hence is preferred. Compositions containing talc have been stored for as long as one year without caking. Although the filler may settle during storage, it is very easily dispersed. Fillers which react with water to alter the pH of the composition, e.g. calcium oxide, cannot be used in the composition of the present invention.

A dispersant should be used to wet the filler during processing and to inhibit filler-caking during storage. Although the filler may settle somewhat during storage, it is very easily dispersed and remains dispersed during application. Anionic surfactants are preferred as dispersants because the polyurethane dispersions employed in the composition are anionic. "Nopcosant"K, a proprietary anionic surfactant manufactured by Diamond Shamrock Corp., Morristown, NJ, is particularly preferred for the composition. Other suitable dispersants include "Triton" CF-10, an alkylaryl polyether manufactured by Rohm & Haas Co., Philadelphia, PA; "Anti Terra" U-80, manufactured by Byk-Mallinckrodt, Melville, NY; "Igepal" CA-630, octylphenoxypoly(ethyleneoxy)ethanol manufactured by GAF Corp., New York, NY; and "Surfynol" 104A, a solution of tetramethyl decynediol in 2-ethyl hexanol manufactured by Air Products & Chemicals, Allentown, PA.

Foam control agents may be employed to minimize foaming during formulation and application of the composition. Surfactants derived from fatty acids are preferred as foam control agents. "Foamkill" 608, a fatty acids surfactant manufactured by Crucible Chemical Co., Greenville, SC, is particularly desirable for the composition. Other suitable foam control agents include "Nalco" 232A, manufactured by Nalco Chemical Co., Oakbrook, IL; "Foamaster" W-55, a nonionic surfactant manufactured by Diamond Shamrock Corp.; "Foambreaker," manufactured by Guardian Chemical Corp., Hauppauge, NY.

Flow/leveling agents may be employed to aid the composition to level evenly and provide a smooth film. Surfactants derived from silicone are preferred as flow/leveling agents. "Byk" 301, a silicone surfactant manufactured by Byk-Mallinckrodt, Melville, N.Y. is preferred for the composition. Other suitable flow/leveling agents include "Fluorad" FC 120, an anionic fluorochemical manufactured by 3M Co., St. Paul, MN; "DC" 14, manufactured by Dow Corning, Midland, MI; "Triton" GR-7M, dioctyl sodium sulfosuccinate manufactured by Rohm & Haas Co., Philadelphia, PA.

Pigments are useful for the purpose of rendering the sealed area visually discernible, the sealer of the present invention often being semitransparent. Suitable pigments include water-dispersible pigments such as titanium dioxide, carbon black, lampblack, red iron oxide, and numerous others. The preferred pigment is lampblack.

It is highly desirable to add material to the composition to render it non-corrosive to metals, e.g., containers, application equipment, and spray equipment. A volatile base can be added to the composition to increase the pH. The base may be described as a fugitive base, i.e., one which evaporates quickly after application to the substrate, leaving substantially no polar groups in the composition after it is applied. Residual polar groups would attract moisture, resulting in bubbling and blistering of the coating. Suitable bases include ammonium hydroxide, morpholine, and triethyl amine.

The percentage of each ingredient in the coating composition may be varied over a moderate range. The coating composition should contain from about 5 to about 45 weight percent urethane polymer, from about 25 to about 55 weight percent water, from about 20 to about 40 weight percent monohydric alcohol having less than seven carbon atoms, from about 0 to about 20 weight percent filler, from about 0 to about 1 weight percent dispersant, from about 0 to about 3 weight percent foam control agent, from about 0 to about 1 weight percent flow/leveling agent, from about 0 to about 5 weight percent pigment, and from about 0 to about 1 weight percent volatile base. The following table sets forth the preferred level of each ingredient on the basis of percent by weight.

TABLE IV

| Ingredient | Preferred Level (Weight Percent) |
|---|---|
| Urethane polymer | 15.0 |
| Water | 37.7 |
| Alcohol | 30.5 |
| Filler | 13.0 |
| Dispersant | 0.2 |
| Foam Control Agent | 1.1 |
| Flow/Leveling Agent | 0.1 |
| Pigment | 1.4 |
| Volatile base* | 1.0 |

*Sufficient volatile base should be added to prevent corrosion to containers and application equipment.

The preferred composition of the present invention exhibits desirable properties in the areas of (1) application, (2) storage, (3) sealability, (4) flexibility, (5) adhesion, and (6) sandability.

The composition can be applied to the substrate bearing the repair material by conventional spray equipment or aerosol delivery. The viscosity of the composition should be in the range of about 100 to about 500 cps at 25° C. in order to allow application by spray equipment. If the pH is maintained at a neutral or somewhat alkaline level, 7.5–11, the composition is non-corrosive to conventional spray equipment. The composition dries within 30 minutes of application, which is comparable to the drying rate of conventional solvent-borne sealers.

The composition effectively seals the substrate from penetration by common organic paint solvents. The seal formed is flexible over the service temperature extremes to which automobiles are often exposed, i.e., from about −40° C. to about 65° C. The composition does not swell microcellular foam urethane substrates.

The use of the coating composition of the present invention for repairing damaged RIM urethane or reinforced RIM urethane is described in the following procedure:

1. Clean the damaged area with soap and water and degrease with solvent.

2. Grind and bevel the substrate to remove jagged edges and to expose more surface area.

3. Scuff sand the surrounding area to feather-edge paint.

4. Apply repair material and sand smooth as required. The repair material is that recommended for flexible plastic automotive parts and in accordance with manufacturer's directions. Suitable repair materials include those based on epoxies, polyesters, and polyurethanes.

5. Apply coating composition by spraying to uniformly and completely cover the repair material with a dried film thickness of approximately 50–75 micrometers. The composition can also be applied by dipping or brushing.

6. Scuff sand and featheredge when the coating composition is dry, i.e. after a period of about 20 to 30 minutes.

7. Apply primer coat and color coat according to manufacturer's recommendation.

The composition of this invention may be used on a wide variety of substrates, including wood, metal, and those made from synthetic organic materials. The composition is, of course, particularly useful for urethane substrates in the form of microcellular foam, e.g. RIM urethane and reinforced RIM urethane.

The invention will be illustrated further by the following examples. It should be understood that the data disclosed serve only as examples and are not intended to limit the scope of the invention. All parts and percentages are by weight unless otherwise indicated.

EXAMPLE I 39.71 parts "Spensol" L-51 dispersion was charged to a glass vessel to which was added in the following order:

0.20 part—"Nopcosant" K
12.91 parts—talc
1.39 parts—lampblack.

The mixture was agitated with a high speed high shear mixer until it was completely blended. The "Spensol" L-51dispersion contained 30% urethane polymer and 70% of a solvent comprising 76% water and 24% N-methyl pyrrolidone. The urethane polymer was hydrolyzed and found to contain 19 mole percent 4,4'-methylene bis(cyclohexylisocyanate), 30 mole percent adipic acid, 28 mole percent hexane diol, 19 mole percent neopentyl glycol, and 3 percent dimethylolpropionic acid. The totals do not add up to 100 percent due to rounding.

The following components, which had been premixed in a separate vessel, were added to the first vessel with stirring:

0.13 part—"Byk" 301 flow/leveling agent
1.39 parts—"Foamkill" 608
0.13 part—1.5% aqueous solution of ammonium hydroxide
17.02 parts—water
27.80 parts—isopropanol.

The viscosity of the resulting mixture was about 250 cps at 25° C.

The foregoing composition was applied with a paint spray gun over damaged RIM urethane which had been repaired with epoxy patching material. After allowing the coating to dry for a period of about 30 minutes, a topcoat of white DuPont Lucite Acrylic Lacquer was applied. No visible swelling of the substrate occurred.

EXAMPLE II

To the coating composition of Example I was added an aerosol propellant, dimethyl ether. The composition was then packaged in an aerosol can, from which it could be readily sprayed. In the absence of isopropanol, the propellant would have caused coagulation of the polyurethane.

EXAMPLE III

A small area of a steel panel, which had been primed with DuPont 80S Red Oxide Primer-Surfacer and painted with Ditzler Delstar Acrylic Enamel, was sanded to bare metal and featheredged to provide a smooth transition from the metal to the surrounding paint. The coating composition prepared in Example I was applied with a paint spray gun and allowed to dry. After the coating had dried, DuPont Lucite Acrylic Lacquer paint was applied over it. The coating protected the underlying paint layers and prevented lifting and wrinkling of these layers when new layers of paint were applied. A panel prepared the same way but without the sealing composition exhibited lifting and wrinkling at the featheredge of the underlying enamel-metal boundary. The procedure described in this example is commonly used to repair and refinish a scratched or otherwise damaged paint surface on metal automobile bodies.

EXAMPLE IV

The procedure of preparing the composition of Example I was repeated, the only exception being that a cross-linking agent, "CX-100", a polyfunctional aziridine manufactured by Polyvinyl Chemical Industries, Wilmington, MA, was added to the polyurethane dispersion in an amount equal to 3.0% by weight of the dispersion. The effect of the cross-linking agent was to improve the water resistance of the coating. However, because the cross-linking agent made the applied coating more rigid, it is not desirable for use with compositions intended for urethane substrates or other substrates formed of flexible synthetic material. The cross-linking agent is intended for use in compositions for metal substrates.

EXAMPLE V

The procedure of Example I was repeated, the only exception being that "Witcobond" W-290H was substituted for the "Spensol" L-51. The "Witcobond" W-290H latex is opaque, whereas the "Spensol" L51 dispersion is translucent. The composition was tested under the same conditions as those of Example I. No visible swelling of the substrate occurred.

What is claimed is:

1. Composition for coating a substrate comprising (a) a fully reacted, water-dilutable urethane polymer formed from the reaction of a glycol or polyol of polyester or polyether with diisocyanate, (b) water, and (c) a monohydric alcohol having less than seven carbon atoms, said water comprising from about 25 to about 55 weight percent of said composition.

2. The composition of claim 1 and further including a filler.

3. The composition of claim 1 wherein the monohydric alcohol is isopropanol.

4. The composition of claim 2 wherein the filler is talc.

5. The composition of claim 2 and including a dispersant for the filler.

6. The composition of claim 5 wherein the dispersant is an anionic surfactant.

7. The composition of claim 5 and including a foam control agent, and a foam/leveling agent.

8. The composition of claim 7 and including a pigment.

9. The composition of claim 8 and including a volatile base.

10. The composition of claim 9 comprising from about 5 to about 45 weight percent of a fully reacted, water dilutable urethane polymer formed from the reaction of a glycol or polyol of polyester or polyether with a diisocyanate, from about 25 to about 55 weight percent water, from about 20 to about 40 weight percent monohydric alcohol having less than seven carbon atoms, from about 0 to about 20 weight percent filler, from about 0 to about 1 weight percent dispersant, from about 0 to about 3 weight percent foam control agent, from about 0 to about 1 weight percent flow/leveling agent, from about 0 to about 5 weight percent pigment, and from about 0 to about 1 weight percent volatile base.

11. The composition of claim 10 wherein the monohydric alcohol is isopropanol.

12. The composition of claim 10 wherein the filler is talc.

13. The composition of claim 1 wherein the substrate is made from soft fascia material.

14. Method for repairing a substrate comprising the steps of:

(a) preparing the substrate for the application of repair material, (b) applying said repair material to the substrate, (c) applying the coating composition of claim 1 over said repair material, (d) allowing said coating composition to dry.

15. The method of claim 14 and further including the step of applying a color coat over said dried coating composition.

16. The method of claim 14 or 15 wherein the substrate is made form soft fascia material.

* * * * *